United States Patent Office 2,757,186
Patented July 31, 1956

2,757,186

10-NORMETHYL-4-ANDROSTENE-3,11,17-TRIONE AND PROCESS

Herbert C. Murray, Hickory Corners, and Durey H. Peterson, Kalamazoo Township, Kalamazoo County, Mich., assignors to The Upjohn Company, Kalamazoo, Mich., a corporation of Michigan No Drawing. Application June 16, 1954, Serial No. 437,280

3 Claims. (Cl. 260—397.3)

This invention relates to a steroid and is more particularly concerned with 10-normethyladrenosterone and the preparation thereof.

10-normethyladrenosterone, also named 10-normethyl-4-androstene-3,11,17-trione, is represented by the following formula:

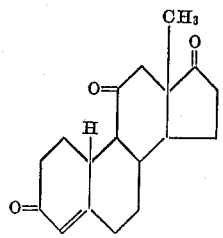

The novel 10-normethyladrenosterone of the present invention may be prepared from 11α-hydroxy-10-normethyltestosterone by oxidation with a chromic acid oxidant as described in application Serial No. 331,491, filed January 15, 1953 (Pat. 2,686,792) of which this is a continuation-in-part.

It is an object of this invention to provide the novel 10-normethyladrenosterone and a process of preparing the same. Other objects will be apparent to those skilled in the art to which this invention pertains.

10-normethyladrenosterone has antifungal, bacteriostatic, sex-hormonal, anabolic, anesthetic and adrencortical hormonal activity. It is also useful as an intermediate in the preparation of 11β-hydroxy-10-normethyltestosterone having anabolic and androgenic activity, for example, by ketalizing the 3-keto position with ethylene glycol, reducing the 11 and 17-keto groups with lithium aluminum hydride, and hydrolyzing the thus obtained 10-normethyl-11β,17β-dihydroxy-4-androstene-3-one 3-ethylene glycol ketal with dilute hydrochloric acid to obtain 11β-hydroxy-10-normethyltestosterone.

The starting material in the present invention is 11α-hydroxy-10-normethyltestosterone prepared by contacting 10-normethyltestosterone with a 24 hour growth of Rhizopus reflexus in solution as described in detail in our application Serial No. 331,491, filed January 15, 1953, now U. S. Patent 2,686,792, issued August 17, 1954.

In carrying out the process of the present invention 11α-hydroxy-10-normethyltestosterone, dissolved in an organic solvent such as acetic acid, benzene, toluene, petroleum ether, hexanes (Skellysolve B), dioxane, or similar solvents or mixtures thereof with acetic acid and benzene being preferred, is oxidized with a solution containing chromic acid. The chromic acid may be added as chromic acid anhydride together with a small but sufficient amount of water to produce the chromic acid ion ($Cr_2O_7''$) or may be produced in situ by reaction between an alkali metal dichromate, such as sodium or potassium dichromate and an acid, for example, acetic acid, or sulfuric acid. The reaction may be carried out in a heterogeneous or a homogeneous system. If the reaction is carried out in a heterogeneous system 11α-hydroxy-10-normethyltestosterone, dissolved in an organic solvent which is inert to oxidation under the reaction condition, such as benzene, chlorobenzene, bromobenzene, hexanes, chloroform, halogenated hydrocarbons, ethyl acetate, or a similar solvent is admixed with a solution of aqueous sodium dichromate or potassium dichromate, acidified with sulfuric acid or sulfuric acid combined with acetic acid. A slight excess of up to ten percent of oxidant above the theoretically required four equivalents may be advantageously utilized. Vigorous agitation is then employed to bring the organic layer into intimate contact with the aqueous solution. The reaction time is mainly dependent on efficient agitation. In the preferred embodiment of the invention the oxidation is performed in homogeneous solution, with acetic acid as the solvent and chromic acid as oxidizing agent; the chromic acid may be produced by a solution of chromic anhydride in eighty percent acetic acid. At the termination of the reaction, excess of chromic acid may be destroyed by adding methyl or ethyl alcohol to the solution and concentrating the solution at room temperature or on the steam bath in vacuo. The temperature of the reaction is maintained between about zero and about fifty degrees centigrade, with temperatures between five and thirty degrees being preferred. The reaction time depends on the temperature and may vary between about one hour to about forty-eight hours or even longer. The thus obtained 10-normethyladrenosterone is isolated from the reaction mixture by conventional methods such as extraction with organic solvents, for example, ether, ethyl acetate, chloroform, methylene dichloride, or water immiscible alcohols and purified by conventional means such as neutralizing and washing the extracts, vaporizing the solvent and recrystallizing the product. Solvent mixtures of methylene dichloride or choloroform with hexanes (Skellysolve B), are preferred for recrystallization.

The following examples are illustrative of the process and products of the present invention but are not to be construed as limiting.

Example 1.—10-normethyladrenosterone

One hundred and five milligrams (105) of 11α-hydroxy-10-normethyltestosterone, dissolved in five milliliters of glacial acetic acid, was cooled to ten degrees centigrade. To this solution was dropwise added sixty milligrams of chromium trioxide, dissolved in five milliliters of eighty percent acetic acid. After the addition of the oxidizing agent the solution was maintained at room temperature for 24 hours. Thereafter the reaction mixture was diluted with ten milliliters of methanol, the mixture was concentrated at room temperature in an air stream and the thus obtained residue was suspended in fifty milliliters of water. The suspension was then extracted three times with twenty-milliliter portions of chloroform, the combined chloroform extracts were washed twice with five percent sodium carbonate solution and twice with water, then dried over anhydrous sodium sulfate and concentrated to give 89.5 milligrams of crystals which were recrystallized twice from methylene dichloride-hexane to yield 55.5 milligrams of 10-normethyladrenosterone of melting point 205 to 207 degrees centigrade. The specific rotation $[\alpha]_D$ was 201 degrees in chloroform.

$$\lambda_{max}^{alc.} = 240.5\ m\mu;\ E\ 16,500$$

Analysis:—Calculated for $C_{18}H_{22}O_3$: C, 75.49; H, 7.74. Found: C, 75.78; H, 7.66.

The oxidation of 11α-hydroxy-10-normethyltestosterone may also be carried out homogeneously, as described above, with potassium or sodium dichromate in acetic acid or acetic acids with small traces of sulfuric acid or with tertiary butyl chromate in benzene or toluene solution.

*Example 2.—10-normethyladrenosterone*

A solution of 11α-hydroxy-10-normethyltestosterone, dissolved in chlorobenzene, was agitated for twelve hours with an aqueous solution of sodium dichromate and dilute sulfuric acid at room temperature. The chlorobenzene layer was separated from the aqueous solution, washed with sodium bicarbonate and water, dried over anhydrous sodium sulfate, and evaporated to yield 10-normethyladrenosterone which was purified by recrystallization as shown in Example 1.

It is to be understood that the invention is not to be limited to the exact details of operation shown and described as obvious modifications and equivalents will be apparent to one skilled in the art, and the invention is therefore to be limited only by the scope of the appended claims.

We claim:
1. 10-normethyladrenosterone of the formula:

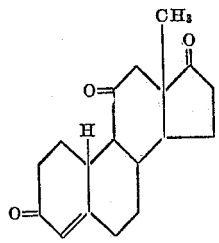

2. A process for the production of 10-normethyladrenosterone which comprises: contacting 11α-hydroxy-10-normethyltestosterone with chromic acid at a temperature between zero and fifty degrees centigrade and separating the thus produced 10-normethyladrenosterone.

3. A process for the production of 10-normethyladrenosterone which comprises: contacting 11α-hydroxy-10-normethyltestosterone with at least four equivalents of chromic acid at a temperature between five and thirty degrees centigrade and separating the thus produced 10-normethyladrenosterone.

References Cited in the file of this patent
UNITED STATES PATENTS 2,602,769    Murray et al. _____ July 8, 1952

OTHER REFERENCES

Fieser et al.: Natural Products Related to Phenanthrene, 3rd ed., p. 423 (1949).